United States Patent
Wu

(10) Patent No.: US 12,425,468 B2
(45) Date of Patent: Sep. 23, 2025

(54) MULTIMEDIA CONTENT TRANSMISSION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Bo Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 30 days.

(21) Appl. No.: 18/590,551

(22) Filed: Feb. 28, 2024

(65) Prior Publication Data

US 2024/0205284 A1    Jun. 20, 2024

Related U.S. Application Data

(63) Continuation of application No. PCT/CN2023/118710, filed on Sep. 14, 2023.

(30) Foreign Application Priority Data

Oct. 20, 2022 (CN) .......................... 202211285291.4

(51) Int. Cl.
   *H04L 65/70* (2022.01)
   *H04L 65/80* (2022.01)

(52) U.S. Cl.
   CPC .............. *H04L 65/70* (2022.05); *H04L 65/80* (2013.01)

(58) Field of Classification Search
   CPC ......... H04L 65/70; H04L 65/80; H04L 65/40; H04L 65/60; H04L 67/60
   See application file for complete search history.

(56) References Cited

U.S. PATENT DOCUMENTS 7,957,691 B1 * 6/2011 Lee .................. H04L 67/306
                                                    455/418
9,301,020 B2 * 3/2016 Sun .................. H04N 21/8456
(Continued)

FOREIGN PATENT DOCUMENTS

CN         1322315 A  * 11/2001  ............. G06F 9/505
CN      103731487 A     4/2014
(Continued)

OTHER PUBLICATIONS

The World Intellectual Property Organization (WIPO) International Search Report for PCT/CN2023/118710 Dec. 13, 2023 8 Pages (including translation).

*Primary Examiner* — Oanh Duong
(74) *Attorney, Agent, or Firm* — ANOVA LAW GROUP, PLLC

(57) ABSTRACT

A multimedia content transmission method includes transmitting to a first server, in response to a trigger operation on multimedia content, a content request message indicating a service type of the multimedia content, and receiving a control message transmitted by the first server and carrying connection information of a second server belonging to a same multimedia service system as the first server. The control message is transmitted by the first server in response to a load of the first server being greater than a load threshold and the service type supporting cooperative transmission. The method further includes modifying locally stored message receiving configuration information based on the connection information, receiving, based on modified message receiving configuration information, a data packet message transmitted by the second server, and obtaining the multimedia content based on splicing results of data packets carried in the data packet message.

20 Claims, 8 Drawing Sheets

(56) References Cited

U.S. PATENT DOCUMENTS

| | | | |
|---|---|---|---|
| 9,846,696 B2* | 12/2017 | Arngren | ................. G06F 16/41 |
| 2006/0230120 A1 | 10/2006 | Yasuda | |
| 2008/0072250 A1 | 3/2008 | Osorio et al. | |
| 2008/0151748 A1* | 6/2008 | Virgilio | .............. H04L 12/5692 |
| | | | 370/229 |
| 2011/0066727 A1 | 3/2011 | Palmer et al. | |
| 2019/0281367 A1 | 9/2019 | Westerlund et al. | |

FOREIGN PATENT DOCUMENTS

| | | | | |
|---|---|---|---|---|
| CN | 104469539 A | * | 3/2015 | |
| CN | 110140335 A | | 8/2019 | |
| JP | 3574017 B2 | * | 10/2004 | ......... G06F 11/1662 |
| JP | 2006171822 A | | 6/2006 | |
| WO | 2005033955 A1 | | 4/2005 | |
| WO | 2007101182 A2 | | 9/2007 | |

* cited by examiner

MULTIMEDIA CONTENT TRANSMISSION METHOD AND APPARATUS, DEVICE, AND STORAGE MEDIUM

CROSS-REFERENCE TO RELATED APPLICATIONS

This application is a continuation of International Application No. PCT/CN2023/118710, filed on Sep. 14, 2023, which claims priority to Chinese Patent Application No. 202211285291.4, filed with the China National Intellectual Property Administration on Oct. 20, 2022 and entitled "MULTIMEDIA CONTENT COOPERATIVE TRANSMISSION METHOD AND APPARATUS, DEVICE, AND STORAGE MEDIUM", the entire contents of both of which are incorporated herein by reference.

FIELD OF THE TECHNOLOGY

This application relates to the field of computer technologies, and in particular, to multimedia content transmission technologies.

BACKGROUND OF THE DISCLOSURE

With the continuous development of Internet technologies and multimedia technologies, multimedia content such as audio and videos has become a common information source. For example, the videos are generally classified into live broadcasting service videos and on-demand service videos according to service types. The on-demand service refers to a service type that stores video content of corresponding videos in advance and transmits the video content to a client based on trigger of a playback operation on a specific video on the client. The multimedia content is generally distributed through a content delivery network (CDN). The CDN relies on edge servers deployed at various positions to distribute the multimedia content based on a proximity principle.

Currently, to optimize transmission of the multimedia content, a client-side quality of experience (QoE) index is generally optimized. For example, by adjusting a transmission policy of video traffic, the video traffic can better match a current network state of the client in terms of a transmission rate and a transmission window, thereby optimizing the client-side QoE index. Alternatively, the client-side QoE index is optimized by ameliorating defects in network transport protocols.

However, the above optimization method is based on a precondition that the server has strong traffic transmission performance, that is, the server can cope with huge concurrent network traffic. When traffic requests from the client side increase sharply, performance of the server may be degraded due to a huge number of user requests, resulting in poor traffic transmission performance of the multimedia content.

SUMMARY

In accordance with the disclosure, there is provided a multimedia content transmission method including transmitting, in response to a trigger operation on multimedia content, a content request message to a first server. The content request message indicates a service type of the multimedia content. The method further includes receiving a control message transmitted by the first server and carrying connection information of a second server belonging to a same multimedia service system as the first server. The control message is transmitted by the first server in response to a load of the first server being greater than a load threshold and the service type supporting cooperative transmission. The method also includes modifying locally stored message receiving configuration information based on the connection information to obtain modified message receiving configuration information, receiving, based on the modified message receiving configuration information, a data packet message transmitted by the second server, and obtaining the multimedia content based on splicing results of data packets carried in the data packet message.

Also in accordance with the disclosure, there is provided a multimedia content transmission method applied to a first server and including receiving a content request message transmitted by a client and indicating a service type of multimedia content requested to be acquired, determining, in response to determining that a load of the first server is greater than a load threshold and the service type supports cooperative transmission, to cooperate with a second server in a same multimedia service system as the first server to transmit the multimedia content, transmitting a first control message to the client, and transmitting a second control message to the second server. The first control message carries first connection information of the second server. The second control message carrying second connection information of the client and a message transmission policy to cause the second server to transmit, based on the second connection information, data packets corresponding to a sequence number set indicated by the message transmission policy to the client. The first control message causes the client to receive, based on the first connection information, a data packet message carrying the data packets.

Also in accordance with the disclosure, there is provided a multimedia content transmission method applied to a second server and including receiving a control message transmitted by a first server in a same multimedia service system as the second server. The control message is transmitted by the first server in response to a load of the first server being greater than a load threshold and a service type supporting cooperative transmission. The control message requests cooperating with the first server to transmit multimedia content requested by a client. The control message carries connection information of the client and a message transmission policy. The message transmission policy indicates a sequence number set of data packets needing to be transmitted by the second server. The method further includes acquiring, based on the sequence number set, the data packets, generating a data packet message carrying the data packets, and transmitting, based on the connection information, the data packet message to the client according to the message transmission policy.

BRIEF DESCRIPTION OF THE DRAWINGS

To describe the technical solutions in the embodiments of this application or the related technology more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

Figure 1:
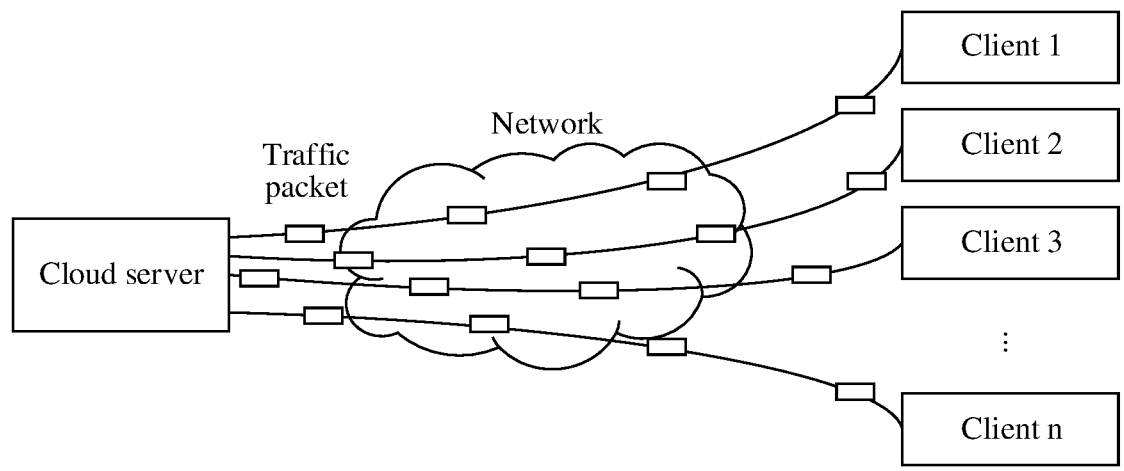
FIG. 1 is a schematic diagram showing a cloud server responding to a large number of audio and video requests.

In order to make objectives, technical solutions, and advantages of embodiments of this application clearer, the technical solutions in the embodiments of this application will be clearly and completely described in the following with reference to the accompanying drawings in the embodiments of this application. It is obvious that the embodiments to be described are only a part rather than all of the embodiments of this application. All other embodiments obtained by a person of ordinary skill in the art based on the embodiments of this application without creative efforts shall fall within the protection scope of this application. The embodiments in this application and features in the embodiments may be mutually combined in case that no conflict occurs. In addition, although certain sequences are shown in the flowcharts, in some cases, the shown or described steps may be performed in sequences different from those herein.

In the embodiments of this application, multimedia content means compressing a series of media data and transmitting the data in segments over the Internet to instantly transmit the media data over the Internet for use by a client. For example, the multimedia content may be, audios, videos, or the like. In other words, this form of content allows data packets to be transmitted like water, which may also be called streaming media.

Service types may refer to types of services providing processing required by multimedia content. The service types may generally include a live broadcasting service type and an on-demand service type. According to the service types, the multimedia content may generally be classified into a live broadcasting service and an on-demand service. For example, the multimedia content is videos, the on-demand service may refer to a service type that stores video content of the corresponding videos in advance and transmits the video content to the client based on triggering of a playback operation on a specific video on the client, while the live broadcasting service means that video content is recorded in real time and transmitted immediately without being stored in advance, such as current live broadcasting rooms, real-time videos, or real-time video conferences.

Currently, to optimize the client-side QoE index, on the one hand, congestion control algorithms adapted to specific audio and video services are adopted. The congestion control algorithms may be rule-based or machine learning-based, whose ultimate goal is to adjust a traffic transmission policy to enable audio and video traffic to better match a current network state in terms of a transmission rate and a transmission window, thereby achieving optimization of the QoE index. On the other hand, network transport protocols designed or optimized for audio and video services are adopted. For example, based on a transport control protocol (TCP), a multipath TCP (MPTCP) method is proposed, or based on a user datagram protocol (UDP) transport protocol, a UDP-based low-latency Internet transport layer protocol (Quick UDP Internet Connection, QUIC) and a multi-path QUIC transport protocol (MP-QUIC) are designed. A core idea of such a method is to improve the network transport protocols by ameliorating defects existing in the network transport protocols and by enabling new transmission functions.

However, the above optimization method is based on a precondition that the server has strong traffic transmission performance, that is, the server can cope with huge concurrent network traffic. When traffic requests from the client side increase sharply, performance of the server may be degraded due to a huge number of user requests, resulting in poor traffic transmission performance of the multimedia content. Refer to FIG. 1 which is a schematic diagram showing a cloud server responding to a large number of audio and video requests. When a large number of clients transmit traffic request messages to the cloud server, the cloud server may respond to the requests of the clients one by one. If n clients transmit requests at the same time at a certain moment, when the cloud server responds to the request of Client 1, resources thereof are occupied. In this case, the requests of Client 2, . . . , and Client n cannot be responded to in a timely manner, so that the clients cannot receive, in a timely manner, audio and video traffic transmitted from the cloud server, thereby causing lag or high first-frame latency in an application layer player of the client, leading to poor user experience.

Moreover, currently, the multimedia content is generally distributed through a content delivery network (CDN). The CDN relies on edge servers deployed at various positions to distribute the multimedia content based on a proximity principle. However, different servers have different loads, and each server also has a capability to respond to the request to transmit the multimedia content. Therefore, cooperative transmission can be performed through servers with lower loads, thereby increasing a response speed of the multimedia content and improving overall system resource utilization.

Based on this, an embodiment of this application provides a multimedia content transmission method. In the method, when a client transmits a content request message to a first server, if the first server determines that the first server cannot respond to the client in time due to a high load thereof and a service type requested by the content request message is a type supporting cooperative transmission, the first server may determine to transmit multimedia content through cooperative transmission, that is, a low-load second server may be used as a backup server to assist the first server with the high load in processing the content request message, and then the first server transmits, to the second server, a second control message carrying second connection information of the client and a message transmission policy. As a result, as indicated by the message transmission policy, the second server transmits the corresponding data packets to the client according to the second connection information. Moreover, the first server may further return, to the client, a first control message carrying first connection information of the second server, so that the client modifies locally stored message receiving configuration information according to the first connection information, can receive, based on modified message receiving configuration information, a data packet message transmitted by the second server, and may finally obtain the multimedia content after splicing the data packets. As can be seen, according to this embodiment of this application, by means of multi-source cooperative transmission, the problem of a poor client-side QoE index caused by degraded traffic transmission performance of the high-load server due to performance degradation thereof is alleviated, so that a response speed of the multimedia content is increased, thereby improving use experience of an on-demand service of the multimedia content. Moreover, the use of the low-load server for assistance can help balance load conditions between servers and improve overall system resource utilization.

In addition, in this embodiment of this application, when transmitting the data packet message, the second server fills a message sequence number field of the data packet message with sequence number of data packets carried therein, replacing the solution in the related art of filling the message sequence number field through connection, so that the client can more conveniently know the sequence numbers of the data packets received, so as to determine whether there is a packet loss, and when there is the packet loss, can also promptly determine a server with the packet loss and then promptly notify the server to perform retransmission, which increases an acquisition speed of the multimedia content to some extent, thereby improving use experience of the on-demand service of the multimedia content.

The following is a brief introduction to applicable application scenes of the technical solutions of the embodiments of this application. The application scenes introduced below are only used for illustrating instead of limiting the embodiments of this application. During specific implementation, the technical solutions provided in the embodiments of this application can be flexibly applied according to actual requirements.

Figure 2:
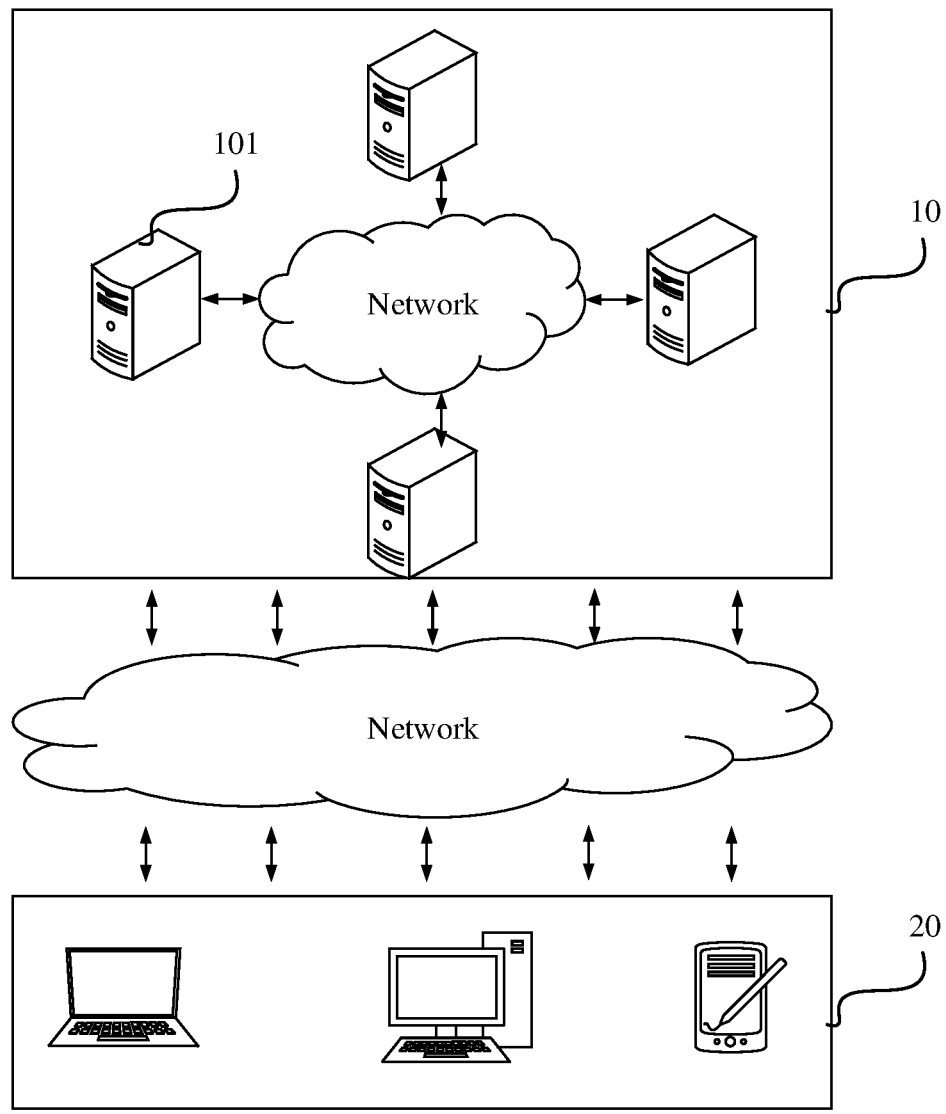
FIG. 2 is a schematic diagram showing an application scenario according to an embodiment of this application.

The solutions provided in the embodiments of this application are applicable to transmission scenes of most multimedia content, for example, transmission scenes of audio or video traffic. Refer to FIG. 2 which is a schematic diagram showing an application scene according to an embodiment of this application. In the scene, a multimedia service system 10 and a terminal device 20 may be included. The multimedia service system 10 includes a plurality of servers 101.

The terminal device 20 may be, for example, a smartphone, a portable Android device (PAD), a notebook computer, a desktop computer, a smart TV, a smart speaker, a smart vehicle-mounted device, or a smart wearable device, but is not limited thereto. A client corresponding to the multimedia service system 10 may be installed on the terminal device 20. The client has functions of on-demand and presentation of multimedia content, which may be, for example, a music application, a video application, or a short video application. The client as referred to in the embodiments of this application may be a software client, a web page, a mini program, or the like. A specific type of the client is not limited.

The multimedia service system 10 is configured to provide a backend service for the client on the terminal device 20, which, for example, transmits multimedia content to the client when the client requests the multimedia content. In some implementations, the plurality of servers 101 that the multimedia service system 10 includes may form a distributed network, each server 101 may provide the backend service for some clients, clients specifically served may be classified according to a policy, for example, according to geographical regions, and different servers are configured to serve clients in different geographical regions; or classified according to client types, and different servers are configured to serve clients of different client types. Each server 101 may be, for example, an independent physical server, or a server cluster formed by a plurality of physical servers, or a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform, but is not limited thereto.

The multimedia content transmission method in this embodiment of this application may be jointly performed by the terminal device 20 and the plurality of servers 101. Specifically, for example, the multimedia content is videos. Then, an operation may be performed on the client to select a video needing to be watched, and a content request message is transmitted to the first server currently connected to the client. The video herein may refer to an on-demand video. Therefore, a service type of the on-demand video may be carried in the content request message, and then after the first server receives the content request message, if a load thereof is high, the video is an on-demand video, which does not have a high requirement for real-time performance compared with a live video. Therefore, other servers may be requested for cooperative transmission. Then, the first server may transmit a first control message to the client and transmit a second control message to the second server, and notify connection information of the client and the second server (which are first connection information and second connection information respectively) and a subsequent message transmission policy of transmitting the video. Then, the second server may transmit, according to the message transmission policy, data packets of the video to the client indicated by the second connection information. Correspondingly, the client may alternatively receive, according to the first connection information, the data packets transmitted by the second server, and finally splice the data packets and transmit spliced data packets to the application layer player for playback. In this way, even if the load of the first server is high, the client can still acquire desired multimedia content quickly, and a response speed of acquisition of the multimedia content is increased, to improve the use experience of the on-demand service.

The connection information is used for representing information of a device needing to be connected, which may include, for example, a connection address of the device needing to be connected. When the device needing to be connected is the second server, the connection information may be called the first connection information. When the device needing to be connected is the client, the connection information may be called the second connection information.

In this embodiment of this application, the terminal device 20 may directly or indirectly communicate with the servers 101 by using one or more networks. The network may be a wired network or a wireless network. For example, the wireless network may be a mobile cellular network or a Wireless-Fidelity (WIFI) network, or may certainly be other possible networks, which is not limited in this embodiment of this application.

In a possible implementation, the technical solution in this embodiment of this application may be implemented based on a cloud technology. The cloud technology is a hosting technology that unifies a series of resources such as hardware, software, and networks in a wide area network or a local area network to implement computing, storage, processing, and sharing of data. The cloud technology is a general term for a network technology, an information technology, an integration technology, a management platform technology, an application technology, and the like based on an application of a cloud computing business mode, and may form a resource pool, which is used as required and is flexible and convenient. A cloud computing technology will become an important support. A backend service of a technical network system requires a large amount of computing and storage resources, such as a video website and more portal websites. As the Internet industry is highly developed and applied, each article may have its own identifier in the future, which needs to be transmitted to a backend system for logical processing. Data at different levels may be separately processed, and data in various industries requires strong system support, which can only be implemented through cloud computing.

Specifically, during specific implementation, the servers may be implemented by using cloud servers based on the cloud technology, and the cloud servers regularly synchronize respective loads to select backup servers from cloud servers with lowers load for cooperative transmission. In addition, the cloud servers form a distributed storage system, and each cloud server may synchronously store all multimedia content to facilitate subsequent distribution of the multimedia content. For example, when the multimedia service system 10 is a backend service system of a video website, any server 101 included therein may store all videos of the video website, and no matter which server 101 receives the content request message, the server may respond and transmit a corresponding video.

FIG. 2 is merely an example. In fact, quantities of the terminal device and the server are not limited, which are not specifically limited in this embodiment of this application.

The multimedia content transmission method provided in an exemplary implementation of this application will be described below with reference to the accompanying drawings in conjunction with the application scene described above. The above application scene is only shown to facilitate understanding of the spirit and principles of this application, and the implementation of this application is not limited in this regard.

Figure 3:
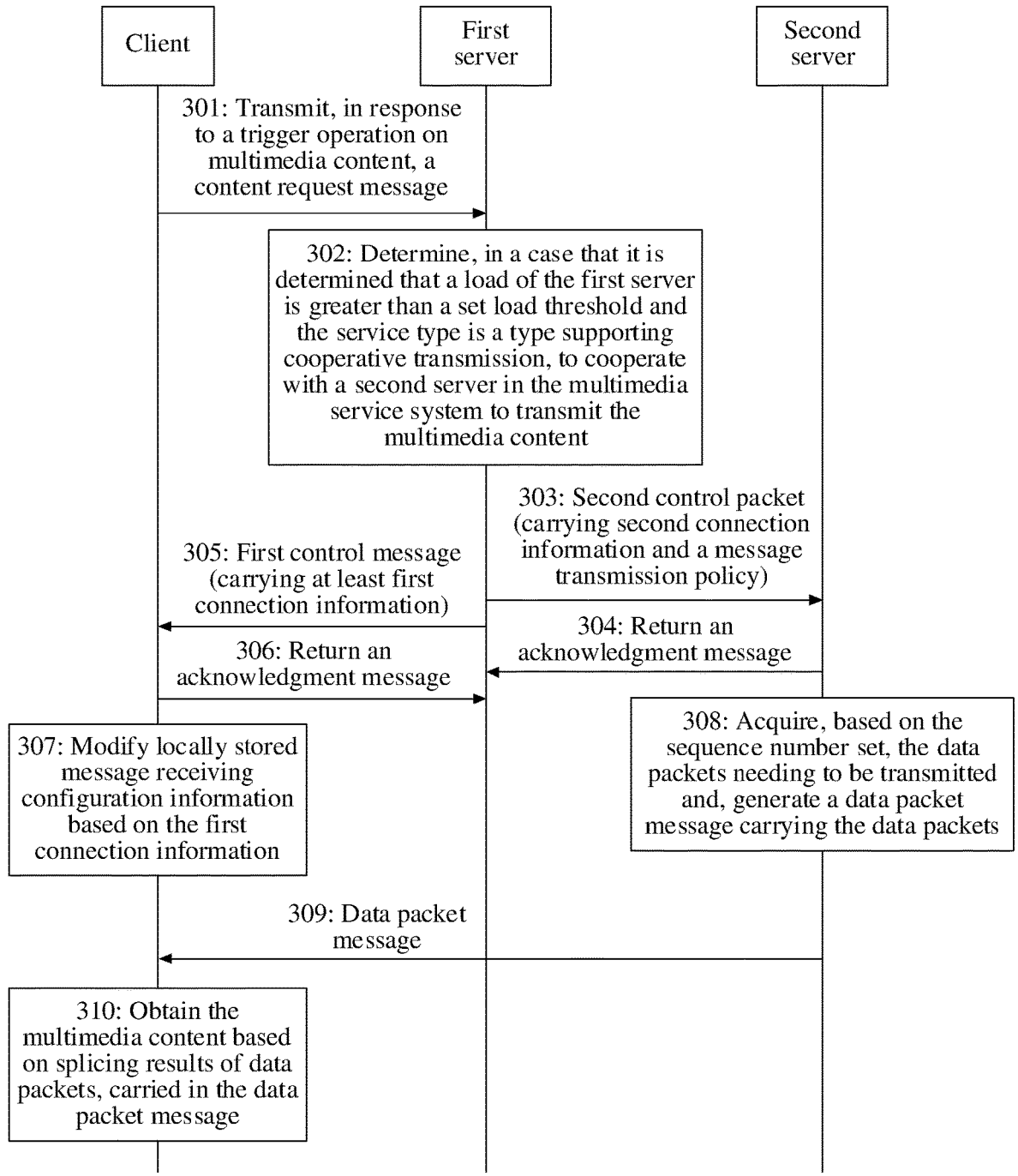
FIG. 3 is a schematic flowchart of a multimedia content transmission method according to an embodiment of this application.

Refer to FIG. 3 which is a schematic flowchart of a multimedia content transmission method according to an embodiment of this application. A specific implementation process of the method is as follows:

Step 301: Transmit, in response to a trigger operation on multimedia content, a content request message to a first server, the content request message indicating a service type of the multimedia content.

In this embodiment of this application, when starting, the client may be connected to a corresponding backend server to acquire to-be-displayed data by interacting with the backend server to display a client screen. Generally, one client may only be connected to one server, and the first server may refer to the background server that establishes a connection with the client.

In a possible implementation, when the client initiates a connection establishment request with the backend server, the connection establishment request needs to be transmitted by using an operator network. Then, the operator network may transmit the connection establishment request to a corresponding server according to a current geographical region, that is, the above first server, to cause the first server to establish a connection with the client. For example, when the terminal device where the client is located is in a region A, the connection may be established with the first server serving the region A. Alternatively, according to a type of the client, the connection may be established with a backend server that serves the type.

Figure 4:
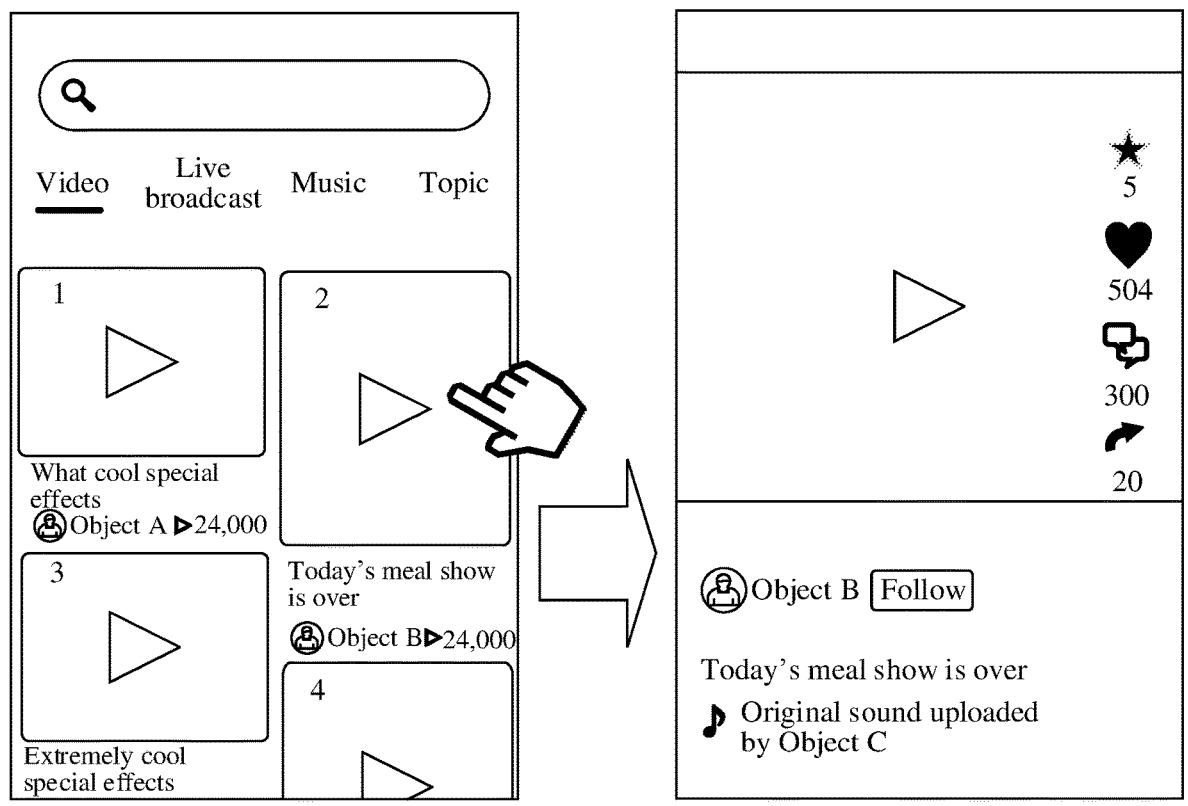
FIG. 4 is a schematic diagram showing operations in a client according to an embodiment of this application.

In this embodiment of this application, the trigger operation may refer to an operation performed on the multimedia content displayed on the client, to indicate a need to acquire the multimedia content. Displaying the multimedia content on the client may be considered as an on-demand service. That is, specific content of the multimedia content has been stored in the server in advance. The stored specific content may be acquired from the server by operating the multimedia content, for playback in the client. Refer to FIG. 4 which is a schematic diagram showing operations in a client. As can be seen, several categories such as videos, live broadcasts, music, and topics are displayed in the client. The videos herein refer to on-demand videos. After a video 2 displayed in an on-demand video category is operated, a content request message may be triggered to be transmitted to the first server to request acquiring video content of the video 2 stored in the first server. Moreover, the content request message may further carry a current service type, which is specifically an on-demand service type herein. Similarly, after live broadcasting rooms displayed in a live video category are operated, a live broadcasting room desired to be watched may be operated, or a content request message may be transmitted to the first server to pull a video stream of the live broadcasting room from the first server. Moreover, the content request message may further carry a current service type, which is specifically a live broadcasting service type herein.

In a possible implementation, clients installed in each terminal device may be different, and the clients may support cooperative transmission or may not support cooperative transmission. For example, the clients may have different versions. Then, the clients with new versions support a cooperative transmission function, while the clients with old versions may not support the cooperative transmission function. Therefore, the content request message transmitted by the client to the first server may further carry whether the client supports the cooperative transmission function, that is, whether the client supports other servers other than the first server to respond to the content request message. Certainly, whether the client supports the cooperative transmission function may alternatively be determined according to other attribute information of the client, which is not limited in this embodiment of this application.

Specifically, the content request message may include a transmission type indication field, represented by Mark_Client. When having different values, Mark_Client is used for representing whether the client supports the cooperative transmission function.

In a possible implementation, a length of Mark_Client may be 1 bit, and Mark_Client may be located in a header of the content request message or in data of the content request message. When being a first value, for example, 0x0, Mark_Client is used for representing that the client does not support receiving response messages from other backup servers. Alternatively, when being a second value, for example, 0x1, Mark_Client is used for representing that the client supports receiving the response messages from the other backup servers.

Then, when the content request message is generated, the client, in response to the trigger operation, may determine, based on locally stored client attribute information, whether the client supports cooperative transmission of the multimedia content, to obtain a transmission type determination result of the client. The transmission type determination result is used for indicating whether the client supports cooperative transmission of the multimedia content. Then, a corresponding transmission type indication is generated based on the obtained transmission type determination result, the content request message is generated based on the transmission type indication, and the content request message is transmitted to the first server. The client attribute information is used for reflecting an attribute of the client. The client attribute information may be, for example, version information. Following the above example, when it is determined that cooperative transmission is supported, a Mark_Client field of the content request message is filled with "0x1", and when it is determined that cooperative transmission is not supported, the Mark_Client field of the content request message is filled with "0x0".

Step 302: Determine, in a case that it is determined that a load of the first server is greater than a set load threshold and the service type is a type supporting cooperative transmission, to cooperate with a second server in the multimedia service system to transmit the multimedia content.

In this embodiment of this application, after the first server receives the content request message transmitted by the client, the first server needs to confirm a response manner of the content request message, that is, whether there is a need to request other servers to cooperate to respond.

Specifically, influencing factors of the response manner may include, but are not limited to, one or a combination of the following factors:

(1) Load of the first server. When the load of the first server is lower, the first server is fully capable of responding to the content request message, and the first server to which the client is directly connected is generally a server with an optimal transmission path. Therefore, it is best for the first server to directly provide the service. In this case, the first server may respond to the content request message. If the load of the first server is higher, the first server cannot respond to the content request message in time. To prevent a too long waiting time of the client, other servers may cooperate to respond to the content request message.

(2) Service type of multimedia content requested by the content request message. In an actual scene, for multimedia content of some service types, cooperative transmission cannot be adopted due to characteristics or requirements of the service types. Therefore, there is a need to determine, according to a specific service type, whether the content request message can be cooperatively transmitted. Taking videos as an example, the service types may be classified into a live broadcasting service and an on-demand service. The live broadcasting service has extremely strict requirements on real-time performance and is therefore not suitable for cooperative transmission. Compared with the live broadcasting service, the on-demand service does not have such strict requirements on the real-time performance, so cooperative transmission may be adopted. That is, generally, cooperative transmission may be adopted except for service types with extremely strict requirements on the real-time performance such as live broadcasts.

(3) Attributes of clients. Clients installed on different terminal devices may be different. For example, versions of the clients may be different. Some new functions often appear in new versions. Then it may happen that clients with old versions cannot support the cooperative transmission function at all. Even if cooperative transmission is adopted, it is useless if the clients cannot recognize or use this manner and cannot guarantee normal acquisition of the multimedia content. Therefore, there is a need to combine the attributes of the clients to determine whether cooperative transmission is supported. For example, when a version of a client is a version supporting the cooperative transmission function, the client can support the cooperative transmission function, and cooperative transmission may be adopted. However, when a version of a client is a version not supporting the cooperative transmission function, the client cannot support the cooperative transmission function, and cooperative transmission cannot be adopted.

In a possible implementation, after receiving the content request message transmitted by the client, the first server needs to determine a response manner according to a load thereof and a service type. When the load thereof is too high and the service type is a type supporting cooperative transmission, the first server determines to cooperate with the second server in the multimedia service system to transmit the multimedia content. If the load of the first server is lower or the service type is a type not supporting cooperative transmission, the first server directly responds to the content request message. That is, the first server gradually processes, according to processing logic thereof, the content request message needing to be responded to.

Figure 5:
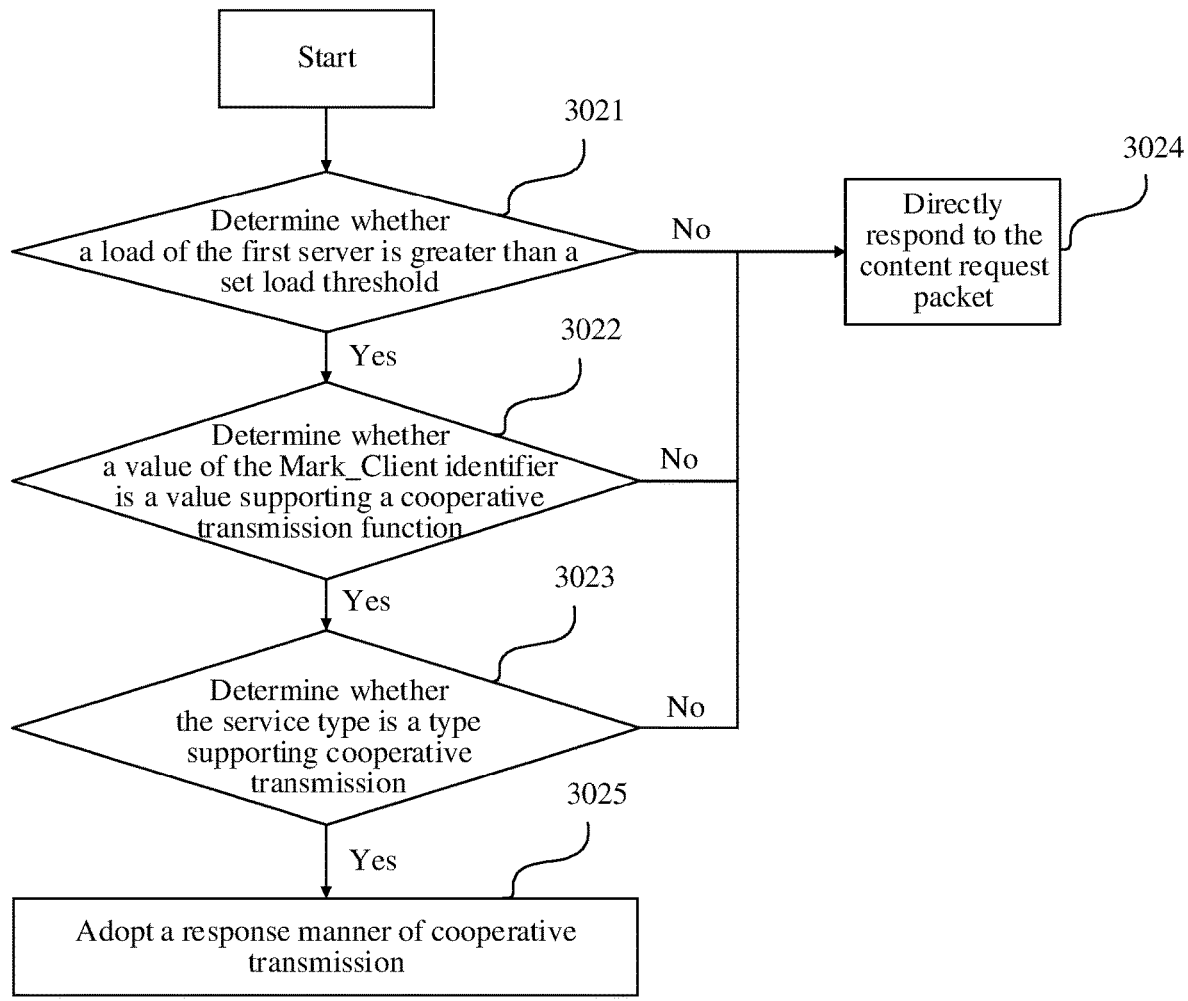
FIG. 5 is a schematic flowchart of determining a response manner according to an embodiment of this application.

In a possible implementation, after receiving the content request message transmitted by the client, the first server needs to determine the response manner according to a load thereof, a Mark_Client identifier in the content request message, and a service type. That is, the response manner may be determined by using a determining process as shown in FIG. 5.

Step 3021: Determine whether a load of the first server is greater than a set load threshold.

Step 3022: If a determination result in step 3021 is yes, determine whether a value of the Mark_Client identifier is a value supporting a cooperative transmission function.

The content request message carries the Mark_Client identifier indicating whether cooperative transmission of the multimedia content is supported. After the first server receives the content request message, it may be known based on the Mark_Client identifier whether the client supports the cooperative transmission function. For example, when the Mark_Client identifier is 0x0, it indicates that the client cannot support the cooperative transmission function. When the Mark_Client identifier is 0x1, it indicates that the client supports the cooperative transmission function, and then there is a need to determine whether a value of the Mark_Client identifier is 0x1. If not, cooperative transmission cannot be adopted.

Step 3023: If a determination result in step 3022 is yes, determine whether the service type is a type supporting cooperative transmission.

Step 3024: If the determination result in step 3021 is no, or if the determination result in step 3022 is no, or if a determination result in step 3023 is no, determine that the first server directly responds to the content request message.

Step 3025: If the determination result in step 3023 is yes, determine that a response manner of cooperative transmission (also refer to as a "cooperative transmission response manner") is adopted.

For example, when the service type is a live broadcasting service, the first server directly responds to the content request message. When the service type is a non-live broadcasting service, such as an on-demand service, cooperative transmission is adopted.

During specific implementation, an order in which the above factors are determined is not limited. That is, the order in which the above factors are determined may be sequential execution according to FIG. 5, or the service type may be determined first and then the Mark_Client is determined, or the above factors are determined in parallel.

For example, the multimedia content is videos, and a response manner of the content request message corresponding thereto may be as follows:

(1) If the load of the first server is not high, the first server directly responds to a video traffic request (i.e., the content request message).

(2) If the load of the first server is higher (or about to be higher) and the value of the Mark_Client identifier in the message is 0x0, the first server directly responds to the video traffic request.

(3) If the requested service type is a live broadcasting service, the first server directly responds to the video traffic request.

(4) If the load thereof is higher (or about to be higher), the value of the Mark_Client identifier in the message is 0x1, and the service type is a non-live broadcasting service, the first server determines that the response manner is cooperative transmission.

Step 303: The first server transmits a second control message (carrying second connection information and a message transmission policy) to the second server, and the second server receives the second control message.

In this embodiment of this application, if cooperative transmission is adopted, the first server needs to transmit the second control message to a backup server, that is, the second server, to notify the second server of information such as data packets needing to be transmitted by the second server and client information, so that the second server can correctly transmit the data packets to the client.

In a possible implementation, the second control message may carry one or a combination of the following information:

(1) second connection information of the client used for indicating a connection address of the client, so that the second server can correctly transmit the multimedia content;

(2) first connection information of the second server used for indicating a connection address of the second server, so that the second server can verify whether a backup server indicated by the first server includes the first server, preventing the first server from incorrectly transmitting the control messages; and (3) a message transmission policy which is a transmission policy used for instructing the second server to transmit part or all of the multimedia content.

For example, the second control message Pkt_ctl may be indicated in the following format:

$$Pkt\_ctl = \{Server\_bkp, Client\_mark, Send\_policy\}$$

$$Server\_bkp = \{IP\_server\_bkp, Port\_server\_bkp\}$$

$$Client\_mark = \{IP\_client\_mark, Port\_client\_mark\}$$

Server_bkp represents the first connection information, IP_server_bkp represents an Internet protocol (IP) address of the second server, and Port_server_bkp represents a port number of the second server; Client_mark represents the second connection information, IP_client_mark represents an IP address of a terminal device where the client is located, and Port_client_mark represents a port number of the client; and Send_policy represents the message transmission policy.

In this embodiment of this application, the multimedia content is transmitted by data streaming. That is, the multimedia content is generally split into a plurality of data packets, and each data packet includes part of the multimedia content. The message transmission policy indicates which data packets of the multimedia content need to be transmitted by the second server and how to transmit the data packets.

In a possible implementation, Send_policy may be indicated in the following format:

$$Send\_policy = \{Video\_src, Type\_send, Policy\}$$

Video_src represents source information of multimedia content requested by the client and is used for notifying source data information of multimedia content requested by the backup server, and Video_src represents a unique identifier of the multimedia content; and Type_send represents a type indication field and is used for indicating a policy type of the message transmission policy adopted, and Policy represents a transmission policy field and is used for representing specific policy content. The transmission policy field Policy includes a first data field and a second data field. When Type_send has a different value, meanings represented by the first data field and the second data field may be different. In this embodiment of this application, a plurality of policy types is provided. When Type_send has a different value, it indicates that a policy type corresponding to the value is adopted.

In a possible implementation, when Type_send is a first value, such as 0x0, a first policy type is indicated, and the transmission policy field Policy may be as follows to instruct the second server to transmit a message starting number and a message ending number of data corresponding to the multimedia content source Video_src:

$$Policy = \{Pkt\_num\_start, Pkt\_num\_end\}$$

Pkt_num_start represents the first data field and is used for indicating a starting sequence number of the data packets, and Pkt_num_end represents the second data field and is used for indicating an ending sequence number of the data packets. Through Pkt_num_start and Pkt_num_end, a sequence number set of the data packets transmitted by the second server can be determined. For example, Policy={10000, 20000}, indicating that the second server transmits data packets whose sequence numbers are 10000 to 20000.

In a possible implementation, when Type_send is a second value, such as 0x1, a second policy type is indicated, and the transmission policy field Policy may be as follows to indicate interval duration between transmission periods of cooperative transmission performed by the second server and a quantity of data packets transmitted in each of the transmission periods and indicated by the second data field:

$$\text{Policy} = \{\text{Pkt\_period}, \text{Pkt\_amount}\}$$

Pkt_period represents the first data field and is used for indicating an interval at which the second server transmits the data packets, and Pkt_amount represents the second data field and is used for indicating a quantity of the data packets transmitted by the second server at each interval.

Figure 6:
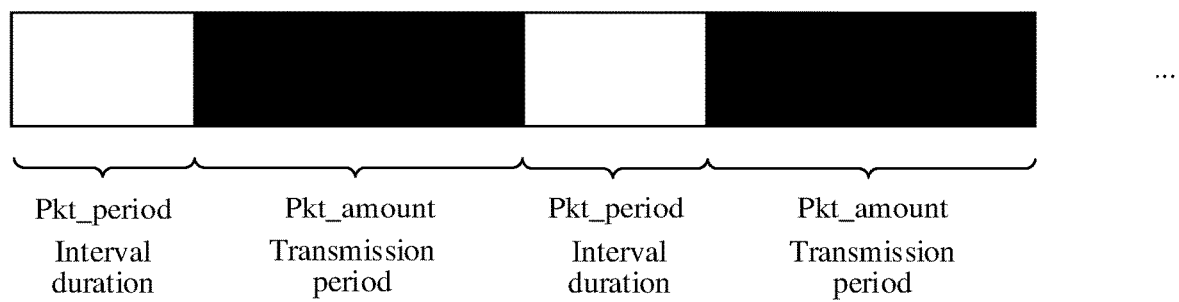
FIG. 6 is a schematic diagram showing a transmission policy of a second policy type according to an embodiment of this application.

Refer to FIG. 6 which is a schematic diagram showing a message transmission policy of a second policy type. Black parts indicate that the second server transmits data of multimedia content to the client. One black part represents a transmission period of cooperative transmission performed by the second server. A quantity of the data packets continuously transmitted in each transmission period is Pkt_amount. An interval between each two transmission periods is the above interval duration, that is, Pkt_period. Within the interval duration, the first server or other servers may transmit data packets to the client.

Certainly, in addition to the two policy types mentioned above, other policy types may also be adopted, which is not limited in this embodiment of this application.

In this embodiment of this application, after the first server determines cooperative transmission, the first server may determine the policy type of the message transmission policy and then generate the corresponding message transmission policy.

In a possible implementation, the first server may determine the policy type of the message transmission policy based on first load information of the first server and second load information of the second server.

If the policy type is the first policy type, the first server needs to determine a sequence number set transmitted by the second server. The sequence number set is a continuous data packet range, including a starting sequence number and an ending sequence number of the data packets. Generally, the type indication field may be configured as the first value, the first data field may be configured as the starting sequence number of the sequence number set, and the second data field may be configured as the ending sequence number of the sequence number set. For example, the first server configures the type indication field as the first value, i.e., configures Type_send as 0x0, configures the first data field as the starting sequence number Pkt_num_start of the sequence number set, and configures the second data field as the ending sequence number Pkt_num_end of the sequence number set, so as to obtain the message transmission policy which is carried in the second control message and transmitted to the second server.

If the policy type is the second policy type, the first server also needs to determine the sequence number set transmitted by the second server. The sequence number set is represented with the interval duration between the transmission periods of the second server and the quantity of the data packets transmitted in each of the transmission periods. Generally, the type indication field may be configured as the second value, the first data field may be configured as the interval duration between the transmission periods during cooperative transmission performed by the second server, and the second data field may be configured as the quantity of the data packets transmitted in each of the transmission periods. For example, the first server configures the type indication field as the second value, i.e., configures Type_send as 0x1, configures the first data field as the interval duration Pkt_period, and configures the second data field as the quantity of the data packets continuously transmitted in each transmission period Pkt_amount, so as to obtain the message transmission policy which is carried in the second control message and transmitted to the second server.

Step 304: The second server returns an acknowledgment message to the first server, indicating that the second control message has been received.

Step 305: The first server transmits a first control message (carrying at least first connection information) to the client, and the client receives the first control message.

Step 306: The client returns an acknowledgment message to the first server, indicating that the first control message has been received.

In this embodiment of this application, to enable the client to correctly receive all data packets of the multimedia content, the first connection information of the second server needs to be transmitted to the client, so that the client can receive the data packet message corresponding to the first connection information.

In a possible implementation, similar to the second control message, the first control message may carry one or a combination of the following information:
  (1) second connection information of the client used for indicating a connection address of the client, so that the second server can correctly transmit the multimedia content;
  (2) first connection information of the second server used for indicating a connection address of the second server, so that the second server can verify whether a backup server indicated by the first server includes the first server, preventing the first server from incorrectly transmitting the control messages; and
  (3) a message transmission policy which is a transmission policy used for instructing the second server to transmit part or all of the multimedia content.

In addition, a format of the first control message may also be similar to that of the second control message, which may be obtained with reference to the above description of the second control message. Details are not described herein again.

During specific implementation, the message transmission policy and the first connection information of the second server may be carried in the first control message, and the message transmission policy and the second connection information of the client may be carried in the second control message, so that, after the second server establishes a connection with the client through the first connection information and the client establishes a connection with the second server through the second connection information, the second server may transmit the data packet message according to the message transmission policy. Similarly, the client may receive the data packet message based on the message transmission policy.

In a possible implementation, after receiving the first control message, the client may parse the type indication field in the first control message, so as to determine the policy type of the message transmission policy to determine the sequence number set of the data packets transmitted by the second server.

If the policy type is determined to the first policy type, the client may determine sequence numbers between a starting sequence number indicated by the first data field and an ending sequence number indicated by the second data field to be the sequence number set. For example, when Type_send is the first value, i.e., 0x0, the policy type is determined to the first policy type, the first data field indicates Pkt_num_start, and the second data field indicates Pkt_num_end. If the first data field is 10000 and the second data field is 20000, the client may determine that the second server transmits data packets whose sequence numbers are 10000 to 20000.

If the policy type is the second policy type, the client may determine the sequence number set based on the interval duration between the transmission periods of cooperative transmission performed by the second server and indicated by the first data field and the quantity of the data packets transmitted in each of the transmission periods and indicated by the second data field. For example, when Type_send is the second value, i.e., 0x1, the policy type is determined to the second policy type, the first data field indicates Pkt_period, and the second data field indicates Pkt_amount. If the first data field is 20 ms and the second data field is 20, the client may determine that the second server transmits packets at an interval of 20 ms and transmits 20 data packets each time, so as to determine the sequence number set of the data packets transmitted by the second server based on this.

Step 307: The client modifies locally stored message receiving configuration information based on the first connection information.

Step 308: The second server acquires, based on the sequence number set, the data packets needing to be transmitted by the second server, and generates a data packet message carrying the data packets.

Step 309: The second server transmits, based on the second connection information, the data packet message to the client according to the message transmission policy. Correspondingly, the client receives, based on modified message receiving configuration information, the data packet message transmitted by the second server.

In this embodiment of this application, after receiving the second control message, the second server may learn that the second server needs to cooperatively transmit the multimedia content, may know, according to the message transmission policy, the sequence number set of the data packets transmitted by the second server and the policy type of the message transmission policy, and may learn information of the client according to the second connection information. Then, when the second server transmits data packets, the second server may acquire corresponding data packets based on a sequence number set needing to be transmitted by the second server, to generate a corresponding data packet message carrying data, and based on the second connection information, transmit the data packet message to the client according to the message transmission policy.

In a possible implementation, if the first server indicates adopting the first policy type, the second server may determine, according to the first data field and the second data field, a starting sequence number and an ending sequence number of data packets needing to be transmitted. Then, data packets between the starting sequence number and the ending sequence number in the multimedia content may be correspondingly acquired, to generate data packet messages carrying the data packets respectively.

For example, the first server instructs, through the first data field and the second data field, the second server to transmit data packets whose sequence numbers are 10000 to 20000, and then the second server, after parsing the second control message, may learn that the second server needs to transmit the data packets whose sequence numbers are 10000 to 20000, so as to acquire the data packets of 10000 to 20000 from all the data packets of the multimedia content stored and generate the data packet messages one by one, which are transmitted to the client according to an IP address and a port number indicated by the second connection information.

In a possible implementation, if the first server indicates adopting the second policy type, the second server may determine, according to the first data field and the second data field, interval duration between data packets needing to be transmitted and a quantity of the data packets needing to be transmitted each time. Then, when a transmission time arrives, data packets of the multimedia content that need to be transmitted within a current transmission period may be correspondingly acquired, to generate data packet messages carrying the data packets respectively.

In this embodiment of this application, when the second server generates the data packet message, for the acquired data packets, the corresponding message sequence number field is filled with sequence numbers corresponding to the data packets to generate the data packet message corresponding to the data packets. For example, when a sequence number of a data packet acquired is 10000, a message sequence number field in a data packet message corresponding to the data packet is configured as 10000. In this way, compared with the manner of taking a sequence number of a connection between the second server and the client as a message sequence number, in this embodiment of this application, a data packet sequence number is directly taken as a message sequence number, so that the client, after receiving the data packet message, can easily determine according to the message sequence number whether there is a packet loss, so as to promptly transmit a packet loss indication to obtain a lost data packet and maximize an acquisition speed of the multimedia content.

In this embodiment of this application, one client may generally only receive messages transmitted by one server. That is, after being connected to the first server, the client may only receive messages transmitted by the first server. Then, to enable the client to correctly receive the data packet message transmitted by the second server, local configuration of the client needs to be modified to some extent.

Specifically, the client may continuously detect messages transmitted by the first server connected thereto, which is based on the locally stored message receiving configuration information. The message receiving configuration information is used for indicating the server from which data packet messages that can be received by the client are. That is, relevant information of the first server may be stored in the locally stored message receiving configuration information, and when a data packet message transmitted by the first server is detected, the data packet message may be acquired without filtering the data packet message transmitted by the first server. Then, after the first connection information is received, the client needs to modify the locally stored message receiving configuration information, that is, add the first connection information to the locally stored message receiving configuration information, so that the client may not filter the data packet message transmitted by the second server.

In this embodiment of this application, after receiving the data packet message, the client needs to determine whether there is a packet loss in the received multimedia content, and if there is the packet loss, needs to notify that retransmission is required, to ensure integrity of the multimedia content.

In a possible implementation, based on the above description, the message sequence number field in the data packet message in this embodiment of this application may be filled with a sequence number of a data packet carried in a data packet message (such a data packet message is also referred to as a "candidate data packet message"), rather than with a connection number in the related art. In a case of filling with the connection number, a serial number may be increased by one if transmission is performed once, regardless of whether a currently transmitted data packet is a retransmitted data packet. For example, if a data packet transmitted first is a data packet 100, the message sequence number is 1, but the client has not received the data packet. When retransmission is performed, the data packet 100 is still transmitted, and the message sequence number is 2, which may increase sequentially. However, in this application, if the data packet 100 is transmitted, the message sequence number is 100. In this way, a data packet loss state of the multimedia content can be determined based on message sequence number fields in received data packet messages. For example, the received data packet messages may be sorted. If there is no missing sequence number after sorting, it may be known that there is no packet loss. If there is a missing sequence number after sorting, it may be known that there is a packet loss.

In a case that the data packet loss state indicates existence of a loss, a target server transmitting a lost data packet may be determined based on the sequence number set and a target sequence number of the lost data packet, and a packet loss indication message is transmitted to the target server. The packet loss indication message is used for instructing the target server to retransmit the lost data packet. The target server may be the first server or the second server configured to transmit data packet messages. That is, there is a need to determine whether the server with the packet loss is the first server or the second server, so as to conveniently notify the server to perform retransmission. Correspondingly, after receiving the packet loss indication message from the client, the target server may immediately retransmit the lost data packet until the client receives the lost data packet. In a case that the sequence number set includes a target sequence number, the target server is determined to be the second server. In a case that the sequence number set does not include the target sequence number, the target server is determined to be the first server.

Certainly, during specific implementation, the target server may alternatively be directly determined to be the first server. That is, regardless of whether an actual server with the packet loss is the first server or the second server, the first server may perform retransmission.

Step 310: The client obtains the multimedia content based on splicing results of data packets carried in the data packet message.

In this embodiment of this application, after receiving the data packet messages transmitted from the first server and the second server, the client may splice, according to message numbers, data packets carried in the data packet messages together, and transmit spliced data packets to the application layer player for playback.

During specific implementation, processes of data splicing and receiving of the data packet messages by the client may be performed together. That is, the client may sort the messages in ascending order according to the message sequence numbers in the messages. If there is no packet loss midway, the spliced multimedia content data may be transmitted to the application layer player for playback. If there is a packet loss midway, the packet loss indication message is immediately transmitted to a corresponding server, so that the server immediately retransmits the lost data packet. In this case, step 310 may be implemented by: obtaining, in a case that it is determined that all data packets of the multimedia content are received, the multimedia content based on the splicing results of the data packets carried in the data packet message.

In this embodiment of this application, the first server may indicate all the data packets of the multimedia content to the second server for transmission, or may indicate part of the data packets of the multimedia content to the second server for transmission. When the second server transmits part of the data packets, the client may also receive the data packet message transmitted by the first server. The data packet message carries the remaining data packets in all the data packets corresponding to the multimedia content. The remaining data packets are data packets in all the data packets other than the data packets transmitted by the second server. That is, after part of the data packets are indicated to the second server, the remaining data packets are transmitted by the first server, and the client may parse the received data packet messages to acquire all the data packets corresponding to the multimedia content respectively from the data packet message transmitted by the first server and the data packet message transmitted by the second server, and then splice the data packets according to sequence numbers corresponding to the data packets, so as to obtain the multimedia content.

In this embodiment of this application, a quantity of the second server is not limited. That is, one or more second servers may be provided, which may be set according to an actual situation.

Figure 7:
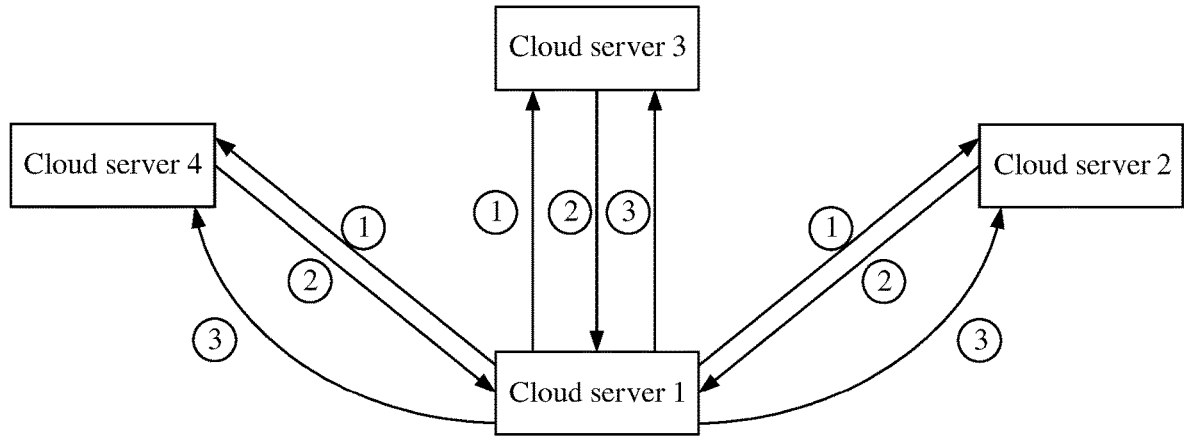
FIG. 7 is a schematic diagram showing load synchronization between servers according to an embodiment of this application.

In this embodiment of this application, the first server may select the second server from the multimedia service system, to which the first server belongs, for subsequent cooperative transmission. During the selection, the first server may try to choose a server with a lower load as the second server. At the same time, there is a need to take into account influencing factors such as transmission latency between certain servers and the terminal device where the client is located, and an optimal second server is selected after all factors are weighed. Therefore, the first server needs to stay in synchronization with loads between the other servers. Refer to FIG. 7 which is a schematic diagram showing load synchronization between servers.

A load of a server is determined by a quantity of requests processed by the server or design flaws (such as code vulnerabilities) thereof. Each server may continuously detect a load thereof, such as central processing unit (CPU) utilization, memory utilization, and other indexes. When the multimedia service system also includes a plurality of servers other than the first server, the second server needs to be determined from the plurality of servers. During specific implementation, when the first server performs load synchronization with the plurality of servers other than the first server in the multimedia service system, the first load information of the first server is transmitted to the plurality of servers respectively, and then the plurality of servers may respectively return corresponding second load information in response to the first load information. The second load information each indicates a load of a corresponding server. Finally, the first server may select the second server from the plurality of servers according to the received second load information.

The synchronization process is similar for each server. Therefore, the description herein is based on an example in which a cloud server 1 shown in FIG. 7 is the first server. Referring to FIG. 7, during load synchronization, the cloud server 1 transmits a load information message to other servers, such as cloud servers 2, 3, and 4 in FIG. 7, which is a message ① in FIG. 7. The message ① carries load information of the cloud server 1 (which may be, for example, the first load information). After receiving the message ①, other cloud servers may transmit load information thereof (such as the second load information) to the cloud server 1, which is a message ② in FIG. 7. After receiving the load information of the other servers, the cloud server 1 may transmit an acknowledgment message to the cloud servers, that is, a message ③ in FIG. 7, indicating that the load information transmitted by the corresponding servers has been received. The steps are repeated until the load information of all the servers is synchronized. Certainly, when the steps are repeated, the cloud server only performs the above steps with the servers whose load information has not been synchronized.

Finally, the cloud server 1 may select at least one server from the other servers as the second server, which serves as a backup server. Such backup servers have low load characteristics. In addition, the cloud server 1 may alternatively select at least one server based on factors such as loads, distances between the terminal device and the servers, network latency, and a packet loss rate.

During an actual application, the second server may change at any time. That is, when the loads of the other servers change, the second server meeting the requirement again may be used for cooperative transmission to ensure higher transmission efficiency.

To sum up, the embodiments of this application propose a multi-source assisted on-demand traffic transmission optimization method, in which servers periodically synchronize loads thereof to select backup servers that provide traffic transmission assistance functions for servers with higher loads. The method may be applied to transmission scenes of traffic such as audios or videos. When a high-load server is faced with a large number of traffic requests and cannot respond in time due to a limited processing capability thereof, a low-load backup server may be requested to assist the high-load server in processing the traffic requests. That is, if the high-load server may transmit a control message to the terminal device and the backup server to notify the terminal device and the backup server of a subsequent traffic transmission policy, the backup server transmits traffic to the terminal device according to the policy, and the terminal device may also receive the traffic from the backup server according to the policy, thereby helping to alleviate problems such as degraded traffic transmission performance caused by performance degradation of the high-load server, deterioration of QoE indexes such as a client-side lag duration and frequency, and improve use experience.

Figure 8:
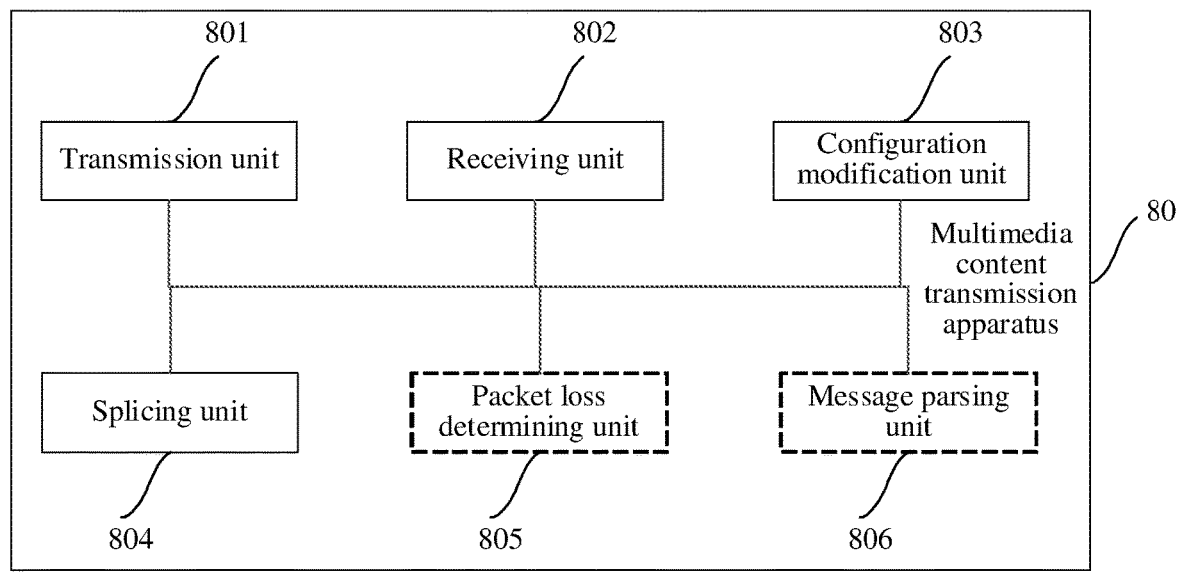
FIG. 8 is a schematic structural diagram of a multimedia content transmission apparatus according to an embodiment of this application.

Referring to FIG. 8, an embodiment of this application further provides a multimedia content transmission apparatus 80 applied to a client. The apparatus includes:

a transmission unit 801 configured to transmit, in response to a trigger operation on multimedia content, a content request message to a first server, the content request message indicating a service type of the multimedia content;

a receiving unit 802 configured to receive a first control message transmitted by the first server, the first control message carrying first connection information of a second server configured for cooperative transmission, the first server and the second server belonging to a same multimedia service system, and a condition based on which the first server transmits the first control message being that a load of the first server is greater than a set load threshold and the service type is a type supporting cooperative transmission;

a configuration modification unit 803 configured to modify locally stored message receiving configuration information based on the first connection information, and receive, based on modified message receiving configuration information, a data packet message transmitted by the second server; and a splicing unit 804 configured to obtain the multimedia content based on splicing results of data packets carried in the data packet message.

In some embodiment, the transmission unit 801 is specifically configured to:

obtain a transmission type determination result based on locally stored client attribute information in response to the trigger operation, the transmission type determination result being used for indicating whether the client supports cooperative transmission of the multimedia content;

generate a corresponding transmission type indication based on the obtained transmission type determination result, and generate the content request message based on the transmission type indication; and transmit the content request message to the first server.

In some embodiments, the first control message further includes a message transmission policy, the message transmission policy indicating a sequence number set of data packets transmitted by the second server, and the apparatus further includes a packet loss determining unit 805 configured to:

determine a data packet loss state of the multimedia content based on message sequence number fields in received data packet messages; where in each of the data packet messages, the message sequence number field is filled with sequence numbers of data packets carried in the data packet message; and determine, in a case that the data packet loss state indicates existence of a loss, a target server transmitting a lost data packet based on the sequence number set and a target sequence number of the lost data packet, and transmit a packet loss indication message to the target server, the packet loss indication message being used for instructing the target server to retransmit the lost data packet;

In a case that the sequence number set includes a target sequence number, the target server is determined to be the second server. In a case that the sequence number set does not include the target sequence number, the target server is determined to be the first server.

The splicing unit 804 is configured to obtain, in a case that it is determined that all data packets of the multimedia content are received, the multimedia content based on the splicing results of the data packets carried in the data packet message.

In some embodiments, the message transmission policy includes a type indication field, a first data field, and a second data field; and the apparatus further includes a message parsing unit 806 configured to:

parse the type indication field to determine a policy type of the message transmission policy;

determine, in a case that the policy type is a first policy type, a sequence number between a starting sequence number indicated by the first data field and an ending sequence number indicated by the second data field to be the sequence number set; and determine, in a case that the policy type is a second policy type, the sequence number set based on interval duration between transmission periods of cooperative transmission performed by the second server indicated by the first data field and a quantity of data packets transmitted in each of the transmission periods and indicated by the second data field.

In some embodiments, the splicing unit 804 is specifically configured to:
receive a data packet message transmitted by the first server, the data packet message transmitted by the first server carrying remaining data packets in all the data packets of the multimedia content, the remaining data packets being data packets in all the data packets other than the data packets transmitted by the second server;
acquire data packets corresponding to the multimedia content respectively from the data packet message transmitted by the first server and the data packet message transmitted by the second server; and
splice the data packets according to sequence numbers corresponding to the data packets to obtain the multimedia content.

The apparatus may be configured to perform the method performed by the client in the embodiments of this application. Therefore, functions that can be realized by the functional modules of the apparatus may be obtained with reference to the description of the foregoing embodiments, which are not described in detail.

Figure 9:
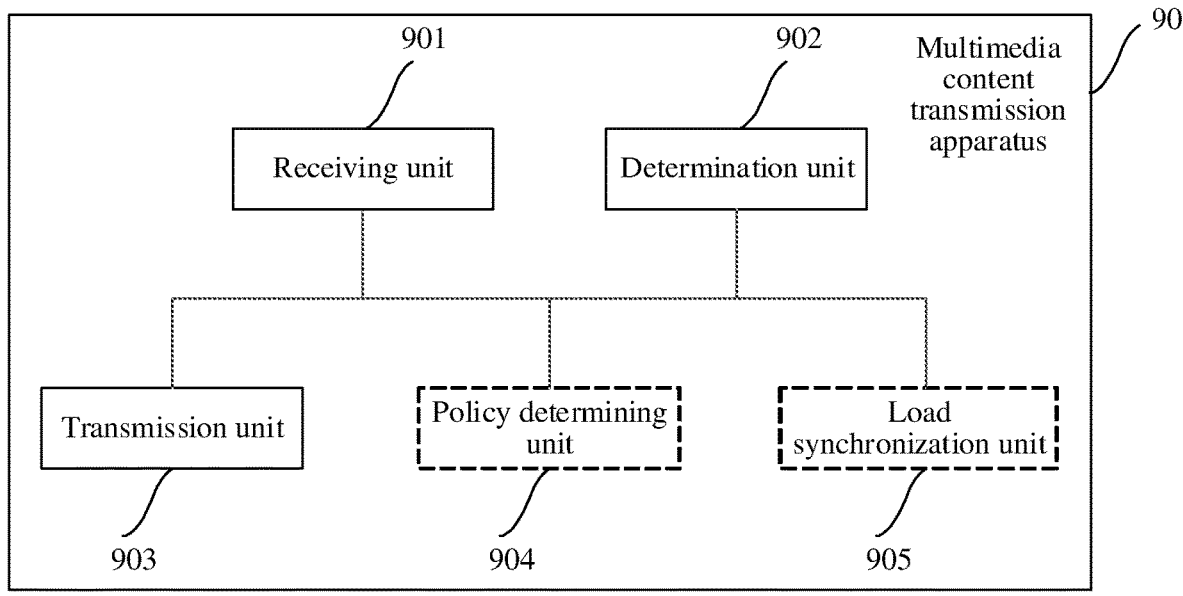
FIG. 9 is a schematic structural diagram of another multimedia content transmission apparatus according to an embodiment of this application.

Referring to FIG. 9, an embodiment of this application further provides a multimedia content transmission apparatus 90 applied to a first server in a multimedia service system. The apparatus includes:
a receiving unit 901 configured to receive a content request message transmitted by a client, the content request message indicating a service type of multimedia content requested to be acquired;
a determining unit 902 configured to determine, in a case that it is determined that a load of the first server is greater than a set load threshold and the service type is a type supporting cooperative transmission, to cooperate with a second server in the multimedia service system to transmit the multimedia content; and
a transmission unit 903 configured to transmit a second control message to the second server, the second control message carrying second connection information of the client and a message transmission policy to cause the second server to transmit, based on the second connection information, data packets corresponding to a sequence number set indicated by the message transmission policy to the client; and transmit a first control message to the client, the first control message carrying first connection information of the second server, so that the client receives, based on the first connection information, a data packet message carrying the data packets.

In some embodiments, the content request message carries a transmission type indication, the transmission type indication being used for indicating whether the client supports cooperative transmission of the multimedia content; and the determining unit 902 is specifically configured to:
determine, in a case that it is determined that the load of the first server is greater than the set load threshold and the service type is the type supporting cooperative transmission and it is determined based on the transmission type indication that the client supports cooperative transmission of the multimedia content, to cooperate with the second server to transmit the multimedia content.

In some embodiments, the message transmission policy includes a type indication field, a first data field, and a second data field, and the apparatus further includes a policy generation unit 904 configured to:
determine a policy type of the message transmission policy based on first load information of the first server and second load information of the second server;
in a case that the policy type is a first policy type, configure the type indication field as a first value, configure the first data field as a starting sequence number of the sequence number set, and configure the second data field as an ending sequence number of the sequence number set; and
in a case that the policy type is a second policy type, configure the type indication field as a second value, configure the first data field as interval duration between transmission periods during cooperative transmission performed by the second server, and configure the second data field as a quantity of data packets transmitted in each of the transmission periods.

In some embodiments, the multimedia service system further includes a plurality of servers other than the first server, and the apparatus further includes a load synchronization unit 905 configured to:
transmit the first load information of the first server to the plurality of servers respectively;
receive second load information returned by the plurality of servers respectively in response to the first load information, the second load information each indicating a load of a corresponding server; and
select the second server from the plurality of servers according to the received second load information.

The apparatus may be configured to perform the method performed by the first server in the embodiments of this application. Therefore, functions that can be realized by the functional modules of the apparatus may be obtained with reference to the description of the foregoing embodiments, which are not described in detail.

Figure 10:
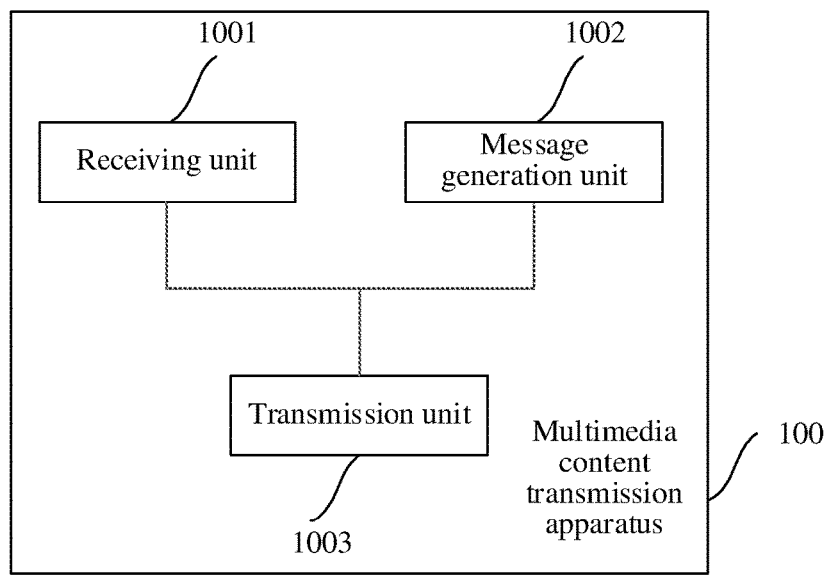
FIG. 10 is a schematic structural diagram of yet another multimedia content transmission apparatus according to an embodiment of this application.

Referring to FIG. 10, an embodiment of this application further provides a multimedia content transmission apparatus 100 applied to a second server in a multimedia service system. The apparatus includes:
a receiving unit 1001 configured to receive a second control message transmitted by a first server in the multimedia service system, a condition based on which the first server transmits the second control message being that a load of the first server is greater than a set load threshold and a service type is a type supporting cooperative transmission, the second control message being used for requesting cooperating with the first server to transmit multimedia content requested by a client, the second control message carrying second connection information of the client and a message transmission policy, the message transmission policy indicating a sequence number set of data packets needing to be transmitted by the second server;
a message generation unit 1002 configured to acquire, based on the sequence number set, the data packets needing to be transmitted by the second server, and generate a data packet message carrying the data packets; and
a transmission unit 1003 configured to transmit, based on the second connection information, the data packet message to the client according to the message transmission policy.

In some embodiments, the data packet message includes a message sequence number field, and the message generation unit 1002 is specifically configured to:

for the acquired data packets, fill the corresponding message sequence number field with sequence numbers of the data packets to generate a data packet message corresponding to the data packets.

The apparatus may be configured to perform the method performed by the second server in the embodiments of this application. Therefore, functions that can be realized by the functional modules of the apparatus may be obtained with reference to the description of the foregoing embodiments, which are not described in detail.

Through the above apparatus, when a high-load server is faced with a large number of traffic requests and cannot respond in time due to a limited processing capability thereof, a low-load backup server may be requested to assist the high-load server in processing the traffic requests. That is, if the high-load server may transmit a control message to the terminal device and the backup server to notify the terminal device and the backup server of a subsequent traffic transmission policy, the backup server transmits traffic to the terminal device according to the policy, and the terminal device may also receive the traffic from the backup server according to the policy, thereby helping to alleviate problems such as degraded traffic transmission performance caused by performance degradation of the high-load server, deterioration of QoE indexes such as a client-side lag duration and frequency, and improve use experience.

Figure 11:
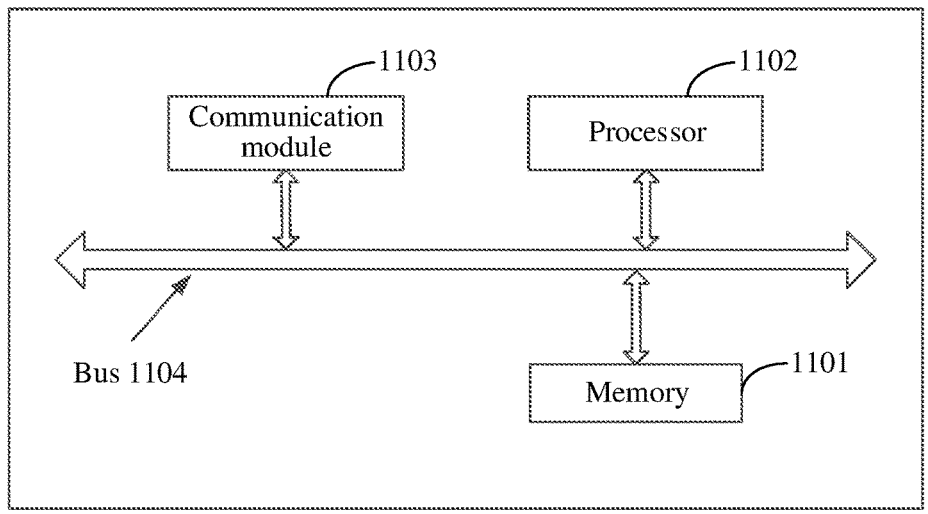
FIG. 11 is a schematic structural diagram of a computer device according to an embodiment of this application.

Referring to FIG. 11, an embodiment of this application further provides a computer device. In an embodiment, the computer device may be the server shown in FIG. 2. The computer device is shown in FIG. 11, including a memory 1101, a communication module 1103, and one or more processors 1102.

The memory 1101 is configured to store a computer program executed by the processor 1102. The memory 1101 may mainly include a program storage area and a data storage area. The program storage area may store an operating system, a program required for running an instant messaging function, and the like. The storage data area is configured to store various instant messaging information, operation instruction sets, and the like.

The memory 1101 may be a volatile memory such as a random-access memory (RAM). The memory 1101 may alternatively be a non-volatile memory such as a read-only memory (ROM), a flash memory, a hard disk drive (HDD) or a solid-state drive (SSD). Alternatively, the memory 1101 is any other medium that can be used for carrying or storing expected program code having an instruction or data structure form, and that can be accessed by a computer, but is not limited thereto. The memory 1101 may be a combination of the above memories.

The processor 1102 may include one or more CPUs, or may be a digital processing unit, or the like. The processor 1102 is configured to invoke the computer program stored in the memory 1101 to implement the above multimedia content transmission method performed by the first server or the second server.

The communication module 1103 is configured to communicate with a terminal device and another server.

In this embodiment of this application, a specific connection medium between the memory 1101, the communication module 1103, and the processor 1102 is not limited. In this embodiment of this application, in FIG. 11, the memory 1101 and the processor 1102 are connected to each other through a bus 1104. The bus 1104 is represented by using a bold line in FIG. 11. A manner of connection between other components is only schematically described, but is not used as a limitation. The bus 1104 may be classified into an address bus, a data bus, a control bus, and the like. For ease of description, the bus in FIG. 11 is represented by using only one bold line, but this does not indicate that there is only one bus or one type of buses.

The memory 1101 stores a computer storage medium. The computer storage medium stores a computer program. The computer program is used for implementing the multimedia content transmission method according to the embodiments of this application. The processor 1102 is configured to perform the multimedia content transmission method performed by the first server or the second server in the above embodiments.

Figure 12:
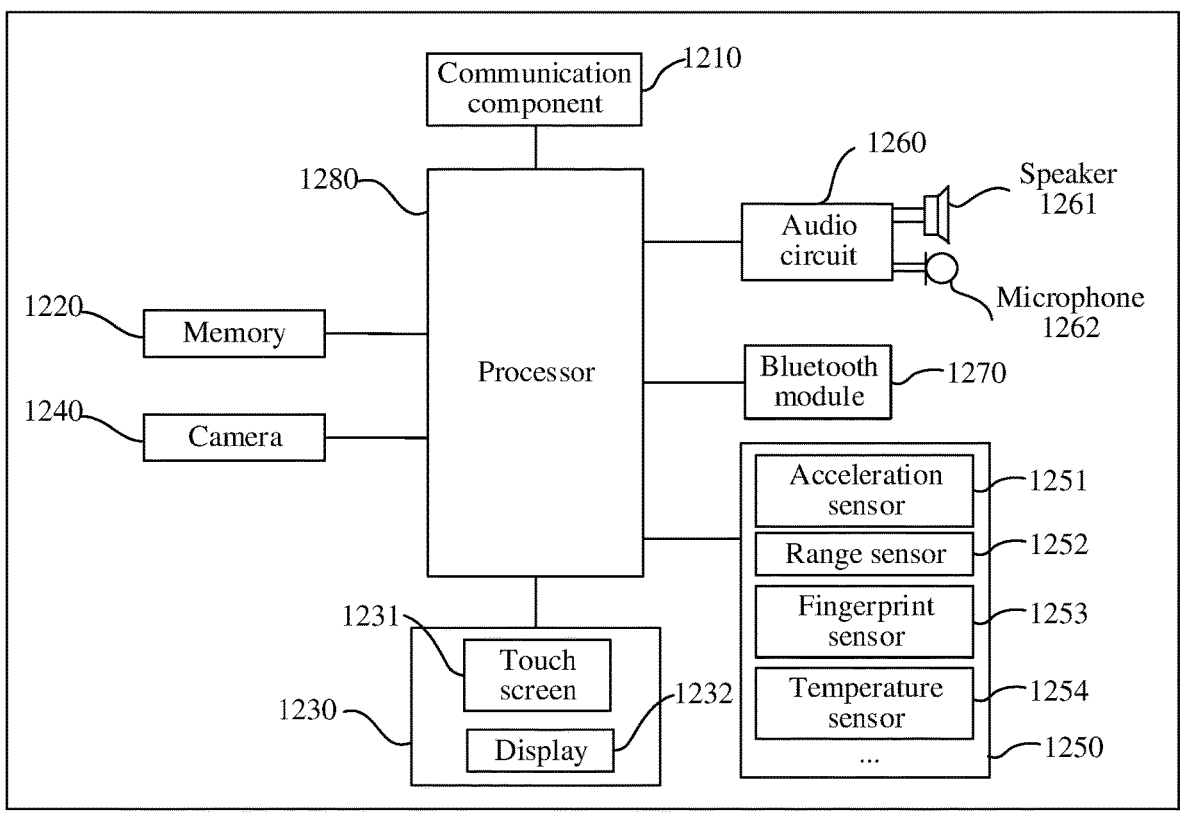
FIG. 12 is a schematic structural diagram of another computer device according to an embodiment of this application.

In another embodiment, the computer device may alternatively be a terminal device, such as the terminal device shown in FIG. 2. In this embodiment, a structure of the computer device may be shown in FIG. 12, including: components such as a communication component 1210, a memory 1220, a display unit 1230, a camera 1240, a sensor 1250, an audio circuit 1260, a Bluetooth module 1270, and a processor 1280. The display unit 1230 may include a touch screen 1231 and a display 1232. The sensor 1250 may be, for example, an acceleration sensor 1251, a range sensor 1252, a fingerprint sensor 1253, or a temperature sensor 1254. The audio circuit 1260 may include a speaker 1261 and a microphone 1262.

The memory 1220 may be configured to store a software program and data. The processor 1280 runs the software program or data stored in the memory 1220, to implement various functions and data processing of the terminal device. The memory 1220 may include a high-speed RAM, and may further include a non-volatile memory such as at least one magnetic disk storage device, a flash memory device, or another volatile solid-state storage device. The memory 1220 stores an operating system that enables the terminal device to run. In this application, the memory 1220 may store an operating system and various application programs, and may also store code for performing the multimedia content transmission method performed by the client in the embodiments of this application.

The processor 1280 is a control center of the terminal device, and is connected to various parts of the entire terminal by using various interfaces and lines. By running or executing the software program stored in the memory 1220 and invoking the data stored in the memory 1220, the processor performs various functions and data processing of the terminal device. In some embodiments, the processor 1280 may include one or more processing units. The processor 1280 may further integrate an application processor and a baseband processor. The application processor mainly processes an operating system, a user interface, an application program, and the like. The baseband processor mainly processes wireless communication. It is to be understood that the above baseband processor may not be integrated into the processor 1280. In this application, the processor 1280 may run an operating system, an application program, user interface display, and a touch response, as well as the multimedia content transmission method in the embodiments of this application. In addition, the processor 1280 is coupled with the display unit 1230.

An embodiment of this application further provides a storage medium. The storage medium stores a computer program. The computer program, when run on a computer, causes the computer to perform steps in the multimedia content transmission method according to various exemplary implementations of this application described above in the specification.

In some possible implementations, each aspect of the multimedia content transmission method provided in this application may be further implemented in a form of a computer program product including a computer program. When the program product is run on a computer device, the computer program is used for enabling the computer device to perform steps in the multimedia content transmission method according to various exemplary implementations of this application described above in the specification. For example, the computer device may perform the steps in the various embodiments.

The program product may be any combination of one or more readable mediums. The readable medium may be a readable signal medium or a readable storage medium. The readable storage medium may be, for example, but is not limited to, an electric, magnetic, optical, electromagnetic, infrared, or semiconductor system, apparatus, or device, or any combination thereof. More specific examples (a non-exhaustive list) of the readable storage medium include: an electrical connection having one or more wires, a portable disk, a hard disk, a RAM, a ROM, an erasable programmable ROM (EPROM or a flash memory), an optical fiber, a compact disc ROM (CD-ROM), an optical storage device, a magnetic storage device, or any appropriate combination thereof.

The program product in the implementations of this application may be a CD-ROM and include a computer program, and may be run on a computer device. However, the program product of this application is not limited thereto. In this application, the readable storage medium may be any tangible medium including or storing a program, and the program may be used by or used in combination with a command execution system, an apparatus, or a device.

The readable signal medium may include a data signal propagated in baseband or propagated as a part of a carrier, and readable program code is carried therein. The data signal propagated in such a way may assume a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with a command execution system, an apparatus, or a device.

The computer program included in the readable medium may be transmitted by using any appropriate medium, including but not limited to, a wireless medium, a wired medium, an optical cable, radio frequency (RF) or the like, or any appropriate combination thereof.

The program code used for executing the operations of this application may be written in one or more programming languages or by a combination thereof. The programming languages include an object-oriented programming language such as Java and C++, and also include a conventional procedural programming language such as "C" or similar programming languages.

Although several units or subunits of the apparatus are mentioned in the foregoing detailed description, such division is only exemplary and not mandatory. Actually, according to the implementations of this application, the features and functions of two or more units described above may be further embodied in one unit. On the contrary, the features and functions of one unit described above may be further implemented by a plurality of units.

In addition, although the operations of the method in this application are described in a specific order in the accompanying drawings, this does not require or imply that the operations are bound to be performed in the specific order, or all the operations shown are bound to be performed to achieve the expected result. Additionally or alternatively, some steps may be omitted, a plurality of steps may be combined into one step for execution, and/or one step may be decomposed into a plurality of steps for execution.

A person skilled in the art can understand that the embodiments of this application may be provided as a method, a system, or a computer program product. Therefore, this application may use a form of hardware-only embodiments, software-only embodiments, or embodiments combining software and hardware. Moreover, this application may use a form of a computer program product that is implemented on one or more computer-usable storage media (including, but not limited to, a disk memory, a CD-ROM, an optical memory, and the like) that include computer-usable program code.

Although exemplary embodiments of this application have been described, a person skilled in the art, once knowing the basic creative concept, can make additional changes and modifications to these embodiments. Therefore, the appended claims are intended to be construed as to cover the exemplary embodiments and all changes and modifications falling within the scope of this application.

Clearly, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A multimedia content transmission method, applied to a client, comprising:
    transmitting, in response to a trigger operation on multimedia content, a content request message to a first server, the content request message indicating a service type of the multimedia content;
    receiving a control message transmitted by the first server, the control message carrying connection information of a second server, the first server and the second server belonging to a same multimedia service system, and the control message being transmitted by the first server in response to a load of the first server being greater than a load threshold and the service type supporting cooperative transmission;
    modifying locally stored message receiving configuration information based on the connection information to obtain modified message receiving configuration information;
    receiving, based on the modified message receiving configuration information, a data packet message transmitted by the second server; and
    obtaining the multimedia content based on splicing results of data packets carried in the data packet message.

2. The method according to claim 1, wherein transmitting the content request message to the first server includes:
    obtaining a transmission type determination result based on locally stored client attribute information, the transmission type determination result indicating whether the client supports cooperative transmission of the multimedia content;
    generating a corresponding transmission type indication based on the transmission type determination result;
    generating the content request message based on the transmission type indication; and transmitting the content request message to the first server.

3. The method according to claim 1,
wherein the control message further includes a message transmission policy indicating a sequence number set of the data packets transmitted by the second server;
the method further comprising, before obtaining the multimedia content based on the splicing results of the data packets carried in the data packet message:
determining a data packet loss state of the multimedia content based on a message sequence number field in a received candidate data packet message, the message sequence number field being filled with sequence numbers of data packets carried in the candidate data packet message;
determining, in response to the data packet loss state indicating existence of a loss, a target server transmitting a lost data packet based on the sequence number set and a target sequence number of the lost data packet, including:
in response to the sequence number set including the target sequence number, determining the second server to be the target server; and
in response to the sequence number set not including the target sequence number, determining the first server to be the target server; and
transmitting a packet loss indication message to the target server, the packet loss indication message instructing the target server to retransmit the lost data packet;
wherein obtaining the multimedia content based on the splicing results includes:
obtaining, in response to determining that all data packets of the multimedia content are received, the multimedia content based on the splicing results of the data packets carried in the data packet message.

4. The method according to claim 3,
wherein the message transmission policy includes a type indication field, a first data field, and a second data field;
the method further comprising, after receiving the control message transmitted by the first server:
parsing the type indication field to determine a policy type of the message transmission policy;
determining, in response to the policy type being a first policy type, sequence numbers between a starting sequence number indicated by the first data field and an ending sequence number indicated by the second data field to be the sequence number set; and
determining, in response to the policy type being a second policy type, the sequence number set based on:
interval duration between transmission periods of cooperative transmission performed by the second server indicated by the first data field, and
a quantity of data packets transmitted in each of the transmission periods and indicated by the second data field.

5. The method according to claim 1, wherein obtaining the multimedia content based on the splicing results includes:
receiving a data packet message transmitted by the first server and carrying remaining data packets in all the data packets of the multimedia content, the remaining data packets being data packets in all the data packets other than the data packets transmitted by the second server;
acquiring data packets corresponding to the multimedia content respectively from the data packet message transmitted by the first server and the data packet message transmitted by the second server; and
splicing the data packets according to sequence numbers corresponding to the data packets to obtain the multimedia content.

6. A computer device comprising:
one or more processors; and
one or more memories storing one or more computer programs that, when executed by the one or more processors, cause the one or more processors to implement the method according to claim 1.

7. The computer device according to claim 6, wherein transmitting the content request message to the first server includes:
obtaining a transmission type determination result based on locally stored client attribute information, the transmission type determination result indicating whether the client supports cooperative transmission of the multimedia content;
generating a corresponding transmission type indication based on the transmission type determination result;
generating the content request message based on the transmission type indication; and
transmitting the content request message to the first server.

8. A non-transitory computer-readable storage medium storing one or more computer programs that, when executed by one or more processors, cause the one or more processors to implement the method according to claim 1.

9. A multimedia content transmission method, applied to a first server, comprising:
receiving a content request message transmitted by a client, the content request message indicating a service type of multimedia content requested to be acquired;
determining, in response to determining that a load of the first server is greater than a load threshold and the service type supports cooperative transmission, to cooperate with a second server in a same multimedia service system as the first server to transmit the multimedia content;
transmitting a first control message to the client; and
transmitting a second control message to the second server;
wherein:
the first control message carrying first connection information of the second server;
the second control message carrying second connection information of the client and a message transmission policy to cause the second server to transmit, based on the second connection information, data packets corresponding to a sequence number set indicated by the message transmission policy to the client; and
the first control message causes the client to receive, based on the first connection information, a data packet message carrying the data packets.

10. The method according to claim 9, wherein:
the content request message carries a transmission type indication indicating whether the client supports cooperative transmission; and
determining, in response to determining that the load of the first server is greater than the load threshold and the service type supports cooperative transmission, to cooperate with the second server to transmit the multimedia content includes:

determining to cooperate with the second server to transmit the multimedia content in response to determining that the load of the first server is greater than the load threshold, the service type supports cooperative transmission, and the transmission type indication indicates that the client supports cooperative transmission.

11. The method according to claim 9,
wherein the message transmission policy includes a type indication field, a first data field, and a second data field;
the method further comprising, before transmitting the second control message to the second server:
  determining a policy type of the message transmission policy based on first load information of the first server and second load information of the second server;
  in response to the policy type being a first policy type, configuring the type indication field as a first value, configuring the first data field as a starting sequence number of the sequence number set, and configuring the second data field as an ending sequence number of the sequence number set; and
  in response to the policy type being a second policy type, configuring the type indication field as a second value, configuring the first data field as interval duration between transmission periods during cooperative transmission performed by the second server, and configuring the second data field as a quantity of data packets transmitted in each of the transmission periods.

12. The method according to claim 9,
wherein the multimedia service system includes a plurality of servers other than the first server;
the method further comprising:
  transmitting first load information of the first server to the plurality of servers;
  receiving second load information returned by the plurality of servers in response to the first load information, the second load information each indicating a load of a corresponding one of the plurality of servers; and
  selecting the second server from the plurality of servers according to the second load information.

13. A computer device comprising:
one or more processors; and
one or more memories storing one or more computer programs that, when executed by the one or more processors, cause the one or more processors to implement the method according to claim 9.

14. The computer device according to claim 13, wherein:
the content request message carries a transmission type indication indicating whether the client supports cooperative transmission; and
determining, in response to determining that the load of the first server is greater than the load threshold and the service type supports cooperative transmission, to cooperate with the second server to transmit the multimedia content includes:
  determining to cooperate with the second server to transmit the multimedia content in response to determining that the load of the first server is greater than the load threshold, the service type supports cooperative transmission, and the transmission type indication indicates that the client supports cooperative transmission.

15. A non-transitory computer-readable storage medium storing one or more computer programs that, when executed by one or more processors, cause the one or more processors to implement the method according to claim 9.

16. A multimedia content transmission method, applied to a second server, comprising:
  receiving a control message transmitted by a first server in a same multimedia service system as the second server, the control message being transmitted by the first server in response to a load of the first server being greater than a load threshold and a service type supporting cooperative transmission, the control message requesting cooperating with the first server to transmit multimedia content requested by a client, the control message carrying connection information of the client and a message transmission policy, and the message transmission policy indicating a sequence number set of data packets needing to be transmitted by the second server;
  acquiring, based on the sequence number set, the data packets;
  generating a data packet message carrying the data packets; and
  transmitting, based on the connection information, the data packet message to the client according to the message transmission policy.

17. The method according to claim 16, wherein:
the data packet message includes a message sequence number field; and
generating the data packet message carrying the data packets includes:
  for the acquired data packets, filling the corresponding message sequence number fields with sequence numbers of the data packets to generate a data packet message corresponding to the data packets.

18. A computer device comprising:
one or more processors; and
one or more memories storing one or more computer programs that, when executed by the one or more processors, cause the one or more processors to implement the method according to claim 16.

19. The computer device according to claim 18, wherein:
the data packet message includes a message sequence number field; and
generating the data packet message carrying the data packets includes:
  for the acquired data packets, filling the corresponding message sequence number fields with sequence numbers of the data packets to generate a data packet message corresponding to the data packets.

20. A non-transitory computer-readable storage medium storing one or more computer programs that, when executed by one or more processors, cause the one or more processors to implement the method according to claim 16.

* * * * *